A. H. GULLBORG.
FOOD CUTTER.
APPLICATION FILED DEC. 17, 1917.
1,284,658.
Patented Nov. 12, 1918.
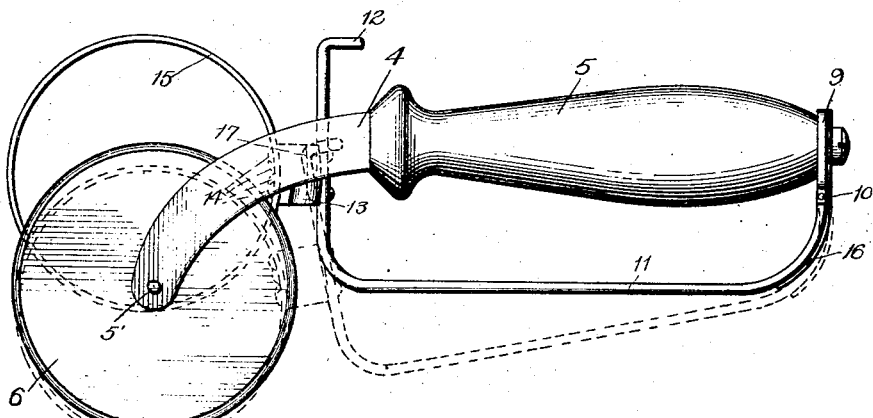
Fig 1
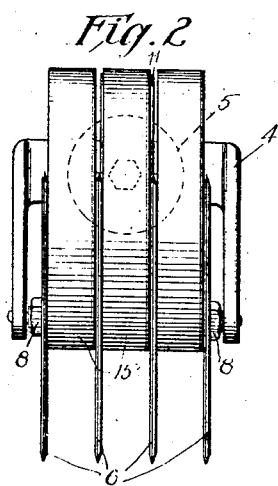
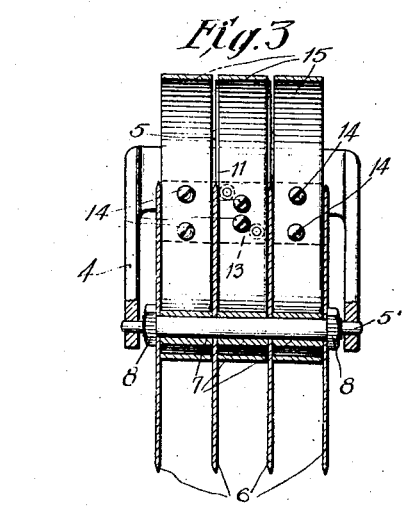
Witnesses:
Albin E. Ahlberg.
H. A. Neiburger
Inventor
Agda H. Gullborg
By Williams Bradbury &c
Attorneys

UNITED STATES PATENT OFFICE.

AGDA H. GULLBORG, OF CHICAGO, ILLINOIS.

FOOD-CUTTER.

1,284,658.  Specification of Letters Patent.  Patented Nov. 12, 1918.

Application filed December 17, 1917. Serial No. 207,461.

*To all whom it may concern:*

Be it known that I, AGDA H. GULLBORG, a citizen of the United States, residing at Chicago, in the county of Cook and State of Illinois, have invented a certain new and useful Improvement in Food-Cutters, (Case 1,) of which the following is a full, clear, concise, and exact description, reference being had to the accompanying drawings, forming a part of this specification.

My invention relates to food cutters, and has for its object the provision of means for effectively cleaning the cutting members during the cutting operation, means whereby the cutting members may be entirely cleaned of the food after the cutting has been accomplished, and the arrangement of the cleaning members so that the operator is fully protected from the cutting members while operating the device.

The device of my invention consists generally of a frame which carries a shaft and upon which are mounted a plurality of cutting disks. The disks are spaced from each other and have extending between each two thereof one of a plurality of cleaning rings, each ring encircling the shaft. The rings are of a width so as to engage the side faces of the cutting disks in order to clean the same of food. The cleaning members are of a diameter substantially that of the cutting disks and are carried by an arm pivoted to the frame. This arm is provided with a fingerpiece which extends upwardly adjacent to the handle for operating the device. Spring means is employed for holding the above mentioned arm and cleaning rings in an upper position, or in a position whereby the cleaning rings project above the cutting disks and effectively prevent the operator's fingers from touching the cutting disks when they are rotated. The fingerpiece enables the operator to depress the arms, and thus the cleaning rings, against the tension of the spring, to move the cleaning rings relative to the cutting disks to completely clean the said disks of food after the cutting operation is completed.

An important feature of my invention is the provision of circular cleaning members so that displacement or distortion of the same is entirely prevented.

My invention will be more clearly understood by referring to the accompanying drawings in which—

Figure 1 is a side elevational view of the cutter of my invention.

Fig. 2 is an end view thereof, and

Fig. 3 is a view partly in elevation and partly in section, illustrating the cutting disks, cleaning rings and shaft upon which the disks are mounted.

Similar characters of reference refer to similar parts throughout the several views.

Referring first to Fig. 1, 4 illustrates a U-shaped frame to which is secured a handle 5, extending horizontally therefrom. The outer end of the U-shaped frame 4 carries a shaft 5' upon which is mounted a plurality of cutting disks 6, the collars 7 serving to space the disks from each other. Nuts 8—8 are provided to retain the disks and collars in position upon the shaft.

The outer end of the handle 5 carries a plate 9 to which is pivoted at 10 an arm 11, which, as illustrated in Fig. 1, extends horizontally immediately under the handle 5, to a position adjacent the cutting disks 6, and upwardly between the legs of the U-shaped frame 4. The upper end of this arm is bent as illustrated at 12 to form a fingerpiece adapted to be operated by the hand of the operator. The forward end of the arm 11 carries a supporting block 13 which has secured to it by means of screws 14—14, a plurality of cleaning rings 15—15. Each one of the cleaning rings 15, as illustrated in Figs. 2 and 3, encircles the shaft 5' and one of the collars 7, and extends between two of the cutting disks. The width of each one of the cleaning rings is substantially the same as the distance between the cutting disks, so that the ring engages the faces of its associated disks.

The arm 11 and cleaning rings 15 are held in the position illustrated in the drawings by means of a spring 16 which is fixed at its upper end to the handle 5 and has its free end abutting against the pivoted end of the arm 11, the tendency of this spring being to move the arm 11 in a clock-wise direction (Fig. 1). The cleaning rings 15 are therefore normally held in a position projecting above the cutting edges of the disks, and thereby serve as a barrier or protector for preventing the operator's hand from coming in contact with the cutting disks. The supporting block 13, which carries the cleaning rings, is cut away immediately above the two inside cutting disks as illustrated by the dotted line 17 (Fig. 1), so that arm 11 and cleaning rings may be moved to the position illustrated in dotted lines in Fig. 1.

In the operation of my device the cleaning rings may be left in the position illustrated in full lines in Fig. 1, and the cutting disks drawn over the food to be cut. The cleaning members 15 may, however, be lowered to any position by merely depressing the fingerpiece 11. The food during the cutting operation is prevented from adhering to the cutting disks by the ring members. In cleaning the rings entirely of food after the cutting has been accomplished, the cleaning rings are moved up and down between the cutting disks to engage the entire inner faces thereof to clean them. It is to be noted that the fingerpiece 12 is positioned so that it may easily be operated by the thumb of the hand which holds the handle.

What I claim is:

1. A food cutter comprising a frame, a shaft carried thereby, a plurality of cutting disks mounted on the shaft and spaced from each other, a plurality of cleaning rings of substantially the same diameter as the cutting disks each disposed between two of said cutting disks and around the shaft, and means for supporting the cleaning rings so as to permit them to have movement relative to the cutting disks to clean the same.

2. A food cutter comprising a frame, a shaft carried thereby, a plurality of cutting disks mounted on the shaft and spaced from each other, a plurality of cleaning rings each disposed between two of said cutting disks and around the shaft, a handle attached to the frame, and an arm pivoted at the outer end of the handle and extending under the same, for carrying the cleaning rings.

3. A food cutter comprising a frame, a shaft carried thereby, a plurality of cutting disks mounted on the shaft and spaced from each other, a plurality of cleaning rings each disposed between two of said cutting disks and around the shaft, means for supporting the cleaning rings so as to permit them to have movement relative to the cutting disks to clean the same, and devices for holding the cleaning rings above the cutting disks to form a protector for the operator.

4. A food cutter comprising a frame, a shaft carried thereby, a plurality of cutting disks carried by the shaft, a plurality of cleaning rings each positioned between two of said cutting disks and around the shaft, means for supporting the cleaning rings so as to permit them to have movement relative to the cutting disks to clean the same, and spring means for holding the cleaning rings above the cutting disks to form a protector for the operator.

5. A food cutter comprising a frame, a shaft carried thereby, a plurality of cutting disks mounted on the shaft and spaced from each other, a plurality of cleaning rings each disposed between two of said cutting disks and around the shaft, a handle attached to the frame, an arm pivoted at the outer end of the handle and extending under the same adapted to support the cleaning rings, and spring means for holding the arm in a position to place the cleaning rings above the cutting disks to serve as a protector for the operator.

6. In a food cutter the combination of a frame, a shaft carried thereby, cutting disks carried by the shaft, a handle secured to the frame and extending horizontally therefrom, cleaning rings each encircling the shaft and positioned between two of the cutting disks, means for supporting the cleaning rings adapted to have movement relative to the frame, a spring for holding the means in a position to project the cleaning rings above the cutting disks to provide a protector for the operator, and a fingerpiece carried by the said means and positioned adjacent to handle so as to be operated to effect movement of the cleaning rings relative to the cutting disks.

7. A food cutter comprising, in combination, a frame provided with a shaft, cutting disks mounted on the shaft, a handle carried by the frame and extending horizontally therefrom, cleaning rings each encircling the shaft and disposed between two of the cutting disks, an arm pivoted at the outer end of the handle and extending under the same for carrying the cleaning rings, a spring for holding the arm in a position whereby the cleaning rings project above the cutting disks, and a fingerpiece carried by the arm and positioned adjacent to the handle to be operated to cause movement of the cleaning rings relative to the cutting disks to clean the same.

In witness whereof, I hereunto subscribe my name this 11th day of December, A. D. 1917.

AGDA H. GULLBORG.

Witnesses:
JOHN S. GULLBORG,
ARTHUR V. GULLBORG.

Copies of this patent may be obtained for five cents each, by addressing the "Commissioner of Patents, Washington, D. C."